(12) United States Patent
    Enomoto et al.

(10) Patent No.: US 10,400,662 B2
(45) Date of Patent: Sep. 3, 2019

(54) VEHICULAR HEAT MANAGEMENT DEVICE

(71) Applicants: DENSO CORPORATION, Kariya-city, Aichi-pref. (JP); TOYOTA JIDOSHA KABUSHIKI KAISHA, Toyota-shi, Aichi-ken (JP)

(72) Inventors: Norihiko Enomoto, Kariya (JP); Yoshiki Kato, Kariya (JP); Masayuki Takeuchi, Kariya (JP); Koji Miura, Kariya (JP); Keigo Sato, Kariya (JP); Kengo Sugimura, Kariya (JP); Nobuharu Kakehashi, Kariya (JP); Ikuo Ozawa, Kariya (JP); Ariel Marasigan, Kariya (JP); Yoshikazu Shinpo, Nisshin (JP); Yoichi Onishi, Okazaki (JP); Toshio Murata, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/763,850

(22) PCT Filed: Sep. 6, 2016

(86) PCT No.: PCT/JP2016/076077
    § 371 (c)(1),
    (2) Date: Mar. 28, 2018

(87) PCT Pub. No.: WO2017/056868
    PCT Pub. Date: Apr. 6, 2017

(65) Prior Publication Data
    US 2018/0238223 A1    Aug. 23, 2018

(30) Foreign Application Priority Data
    Oct. 2, 2015    (JP) .................... 2015-196665

(51) Int. Cl.
    *F01P 7/16*    (2006.01)
    *F01P 3/20*    (2006.01)
    (Continued)

(52) U.S. Cl.
    CPC .................. *F01P 7/16* (2013.01); *F01N 5/02* (2013.01); *F01P 3/18* (2013.01); *F01P 3/20* (2013.01);
    (Continued)

(58) Field of Classification Search
    CPC ....... F01N 5/02; B60H 1/004; B60H 1/00885; B60H 1/00; F01P 3/20; F01P 2060/08;
    (Continued)

(56) References Cited

U.S. PATENT DOCUMENTS

2005/0000473 A1* 1/2005 Ap .................... F01P 7/165
                                                    123/41.1
2008/0276913 A1* 11/2008 Zubeck ................. B60K 6/442
                                                    123/543
(Continued)

FOREIGN PATENT DOCUMENTS

JP      2012166667 A    9/2012
JP      2012184671 A    9/2012
WO      WO-2017145638 A1   8/2017

*Primary Examiner* — Long T Tran
(74) *Attorney, Agent, or Firm* — Harness, Dickey & Pierce, P.L.C.

(57) ABSTRACT

A vehicular heat management device includes a first heat source, a second heat source, a first heat generator, a second heat generator, a heat generator pathway, a first heat source pathway, a second heat source pathway, and a switching portion. The first heat source and the second heat source heat a heat medium. The first heat generator generates heat according to operation. The second heat generator generates heat according to operation. The first heat generator and the second heat generator are provided in the heat generator pathway. The first heat generator is provided in the first heat (Continued)

generator pathway. The second heat generator is provided in the second heat generator pathway. The switching portion switches between a condition where the heat generator pathway is in flowing communication with the first heat generator pathway and a condition where the heat generator pathway is in flowing communication with the second heat generator pathway.

13 Claims, 3 Drawing Sheets

(51) Int. Cl.
| | | |
|---|---|---|
| *F02M 26/23* | (2016.01) | |
| *F01N 5/02* | (2006.01) | |
| *F01P 3/18* | (2006.01) | |
| *F01P 5/10* | (2006.01) | |
| *F01P 11/02* | (2006.01) | |
| *F01P 5/12* | (2006.01) | |
| *F01P 7/14* | (2006.01) | |
| *F02G 5/02* | (2006.01) | |

(52) U.S. Cl.
CPC ............... *F01P 5/10* (2013.01); *F02M 26/23* (2016.02); *F01P 11/0295* (2013.01); *F01P 2005/105* (2013.01); *F01P 2005/125* (2013.01); *F01P 2007/146* (2013.01); *F01P 2025/32* (2013.01); *F01P 2060/08* (2013.01); *F01P 2060/14* (2013.01); *F01P 2060/16* (2013.01); *F02G 5/02* (2013.01); *Y02T 10/16* (2013.01); *Y10S 903/903* (2013.01)

(58) Field of Classification Search
CPC ...... F01P 7/165; F01P 11/0295; F01P 3/2285; F01P 2060/00
See application file for complete search history.

(56) References Cited

U.S. PATENT DOCUMENTS

| | | | | |
|---|---|---|---|---|
| 2010/0242452 A1* | 9/2010 | Kawazu | ................ | F01N 3/0205 60/299 |
| 2016/0109163 A1* | 4/2016 | Enomoto | .............. | F25B 25/005 62/160 |
| 2016/0129756 A1* | 5/2016 | Enomoto | .............. | F25B 25/005 165/202 |
| 2016/0167481 A1* | 6/2016 | Makihara | ................ | B60K 11/02 237/5 |
| 2016/0178253 A1* | 6/2016 | Katoh | ..................... | F25B 41/00 62/185 |
| 2016/0222833 A1* | 8/2016 | Fraser | ..................... | F01K 23/10 |
| 2017/0326945 A1* | 11/2017 | Hatakeyama | ...... | B60H 1/00385 |

* cited by examiner

VEHICULAR HEAT MANAGEMENT DEVICE

CROSS REFERENCE TO RELATED APPLICATIONS

This application is a U.S. National Phase Application under 35 U.S.C. 371 of International Application No. PCT/JP2016/076077 filed on Sep. 6, 2016 and published in Japanese as WO 2017/056868 A1 on Apr. 6, 2017. This application is based on and claims the benefit of priority from Japanese Patent Application No. 2015-196665 filed on Oct. 2, 2015. The entire disclosures of all of the above applications are incorporated herein by reference.

Technical Field

The present disclosure relates to a heat management device for a vehicle.

Background Art

Conventionally, Patent Document 1 discloses an engine cooling device in which an EGR cooler and an exhaust gas heat recovery unit are provided in a coolant circuit.

The EGR cooler is a heat exchanging device that cools an EGR gas by exchanging heat between a coolant and the EGR gas. The exhaust gas heat recovery unit is a heat exchanging device that recovers heat of an exhaust gas by exchanging heat between the coolant and the exhaust gas.

In this known technology, a radiator circuit, a heater circuit, and a bypass circuit are provided in the coolant circuit. The EGR cooler and the exhaust gas heat recovery unit are arranged in parallel with each other in the heater circuit.

In the coolant circuit, a thermostat for a radiator and a thermostat for a heater are provided. The thermostat for a radiator and the thermostat for a heater are opened and closed depending on a temperature of the coolant, and accordingly switch between a condition where the coolant circulates in the radiator circuit, the heater circuit, and the bypass circuit and a condition where the coolant does not circulate in the radiator circuit, the heater circuit, and the bypass circuit.

That is, the thermostats switch, based on the temperature of the coolant, between a condition where the coolant flows through the EGR cooler and the exhaust gas recovery unit and a condition where the coolant does not flow through the EGR cooler or the exhaust gas recovery unit.

PRIOR ART DOCUMENT

Patent Document

Patent Document 1: JP 2012-184671 A

SUMMARY OF THE INVENTION

In the EGR cooler, the coolant is heated by the EGR gas. Accordingly, the coolant heated in the EGR cooler can be used for heating air. That is, the heat of the EGR gas can be used for heating air.

However, when the temperature of the coolant flowing into the EGR cooler is excessively low, a condensed water may be generated when the EGR gas is cooled in the EGR cooler, and accordingly a corrosion may be likely to occur. Therefore, before the coolant is heated up to some extent, the heat of the EGR gas may not be used for heating air because the coolant should not flow into the EGR cooler. Moreover, since the exhaust gas may not be cooled by the coolant, the exhaust gas may not be recirculated to the engine, and accordingly an effect of improving fuel efficiency may not be obtained.

That is, the coolant flowing into the EGR cooler is required to be at or above a predetermined temperature, and the EGR cooler generates heat during operation. It is preferred that the heat medium at or above the predetermined temperature flows early into such device as the EGR cooler.

In the above-described technology, since a heat capacity of an engine cooling system is large, it may be difficult to increase the temperature of the heat medium early to be at or above the predetermined temperature during warming up the engine.

In consideration of the above-described points, it is an objective of the present disclosure to heat a heat medium flowing into a device to be at or above a predetermined temperature early, the device generating heat according to operation and requiring that the heat medium flowing into the device to be at or above the predetermined temperature.

A vehicular heat management device according to an aspect of the present disclosure includes: a first heat source and a second heat source which heat a heat medium; a first heat generator that generates heat according to operation of the first heat generator, the heat medium flowing into the first heat generator being required to be at or above a predetermined temperature; a second heat generator that generates heat according to operation of the second heat generator; a heat generator passage in which the first heat generator and the second heat generator are provided; a first heat source pathway in which the first heat source is provided; a second heat source pathway in which the second heat source is provided; and a switching portion that switches between a condition where the heat generator pathway is in flowing communication with the first heat source pathway and a condition where the heat generator pathway and the second heat pathway are in flowing communication with the second heat source pathway.

According to this, the heat medium heated by the second heat source can be introduced into the first heat generator in addition to the heat medium heated by the first heat source. Further, since the first heat generator and the second heat generator are provided in the same pathway, the heat medium flowing into the first heat generator can be heated by the heat generated by the second heat generator. Accordingly, the heat medium at or above the predetermined temperature can flow early into the first heat generator.

The first heat source may be an engine, for example. The second heat source may be a high-pressure side heat exchanger that exchanges heat between the heat medium and the refrigerant on a high-pressure side of a refrigeration cycle, for example. The first heat generator may be an EGR cooler that exchanges heat between the heat medium and an exhaust gas that is returned to an intake side of the engine, for example. The second heat generator may be an exhaust gas heat recovery unit in which the heat of the exhaust gas of the engine is recovered to the heat medium, for example.

EMBODIMENTS FOR EXPLOITATION OF THE INVENTION

Figure 1:
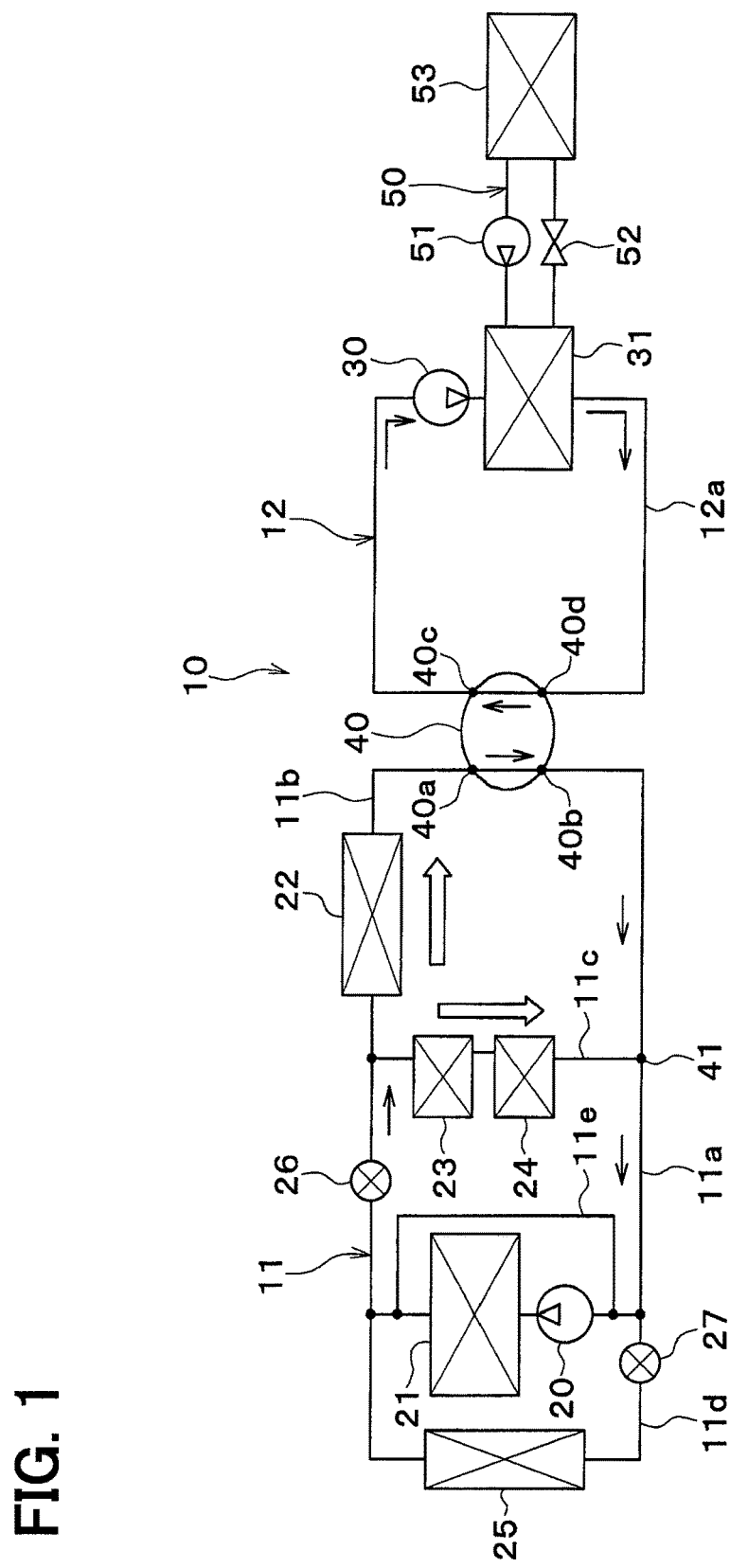
FIG. 1 is a diagram illustrating a vehicular heat management device according to an embodiment of the present disclosure.

Hereinafter, an embodiment will be described below with reference to the drawings. A vehicular heat management device 10 shown in FIG. 1 is used to adjust temperature of various devices mounted on a vehicle or a vehicle compartment to be appropriate.

In this embodiment, the heat management device 10 is applied to a hybrid vehicle that can obtain a vehicle-travel driving force from both an engine and a traveling electric motor.

The hybrid vehicle in this embodiment is configured as a plug-in hybrid vehicle that is capable of charging the battery mounted on the vehicle, with power supplied from an external power source while the vehicle is parked. For example, a lithium ion battery can be used as the battery.

The driving force output from the engine is used not only to cause the vehicle to travel, but also to operate a power generator. The power generated by the power generator and the power supplied from an external power source can be stored in the battery. The power stored in the battery is supplied not only to the traveling electric motor, but also to various vehicle-mounted devices, including electric components constituting the vehicular heat management device 10.

The vehicular heat management device 10 includes an engine cooling circuit 11 and a condenser circuit 12. The engine cooling circuit 11 and the condenser circuit 12 are coolant circuits in which a coolant circulates.

The coolant is a fluid as a heat medium. For example, the coolant suitable for use may be a liquid containing at least ethylene glycol, polydimethylsiloxane or nanoparticles, or an antifreezing fluid.

The engine cooling circuit 11 is a coolant circuit for cooling an engine 21 by the coolant. The engine cooling circuit 11 includes an engine pump (first pump) 20, the engine 21, a heater core 22, an EGR cooler 23, an exhaust gas heat recovery unit 24 and a radiator 25.

The engine 21 is a first heat source that heats the coolant. The engine pump 20 is an electric pump that suctions and discharges the coolant. The engine pump 20 may be a belt driven pump. The belt driven pump is a pump that is driven by a driving force transmitted from the engine through a belt.

The heater core 22 is an air heating heat exchanger that exchanges heat between the coolant and the air blown to a vehicle compartment to heat the blown air. The heater core 22 is a heat exchanger used for heating the vehicle compartment.

The engine pump 20, the engine 21, and the heater core 22 are arranged in series in the engine cooling circuit 11 such that the coolant circulates in this order.

The EGR cooler 23 is a heat exchanger that exchanges heat between an exhaust gas returning to an intake side of the engine 21 and the coolant to cool the exhaust gas. The coolant flowing into the EGR cooler 23 is required to be at or above a predetermined temperature, and the EGR cooler 23 is a first heat generator that generates heat during operation.

The exhaust gas heat recovery unit 24 is a heat exchanger that exchanges heat between the exhaust gas of the engine 21 and the coolant to recover the heat of the exhaust gas. The exhaust gas heat recovery unit 24 is a second heat generator that generates heat during operation.

The EGR cooler 23 and the exhaust gas heat recovery unit 24 are arranged in parallel with the heater core 22 with respect to a flow of the coolant.

The radiator 25 is a coolant-outside air heat exchanger that exchanges heat between the coolant and the air outside the vehicle compartment (hereinafter, referred to as outside air). The radiator 25 is arranged in parallel with the heater core 22, the EGR cooler 23, and the exhaust gas heat recovery unit 24 with respect to the flow of the coolant.

The engine cooling circuit 11 includes an engine pathway 11a, a heater core pathway 11b, a device pathway 11c, a radiator pathway 11d, and a bypass pathway 11e. The engine pathway 11a, the heater core pathway 11b, the device pathway 11c, the radiator pathway 11d, and the bypass pathway 11e each constitutes a coolant pathway through which the coolant flows.

The engine pump 20, the engine 21, and a closing valve 26 are connected in series in the engine pathway 11a. The engine pathway 11a is a first heat source pathway in which the engine 21 that is the first heat source is provided.

The closing valve 26 is an electromagnetic valve that opens and closes a coolant passage in the engine pathway 11a. The closing valve 26 is an interrupting portion that switches between a condition where the coolant flows through the engine pathway 11a and a condition where a flow of the coolant in the engine pathway 11a is stopped. The closing valve 26 is a switching portion that switches a condition of a flowing communication between the engine cooling circuit 11 and the condenser circuit 12.

The heater core 22 is provided in the heater core pathway 11b. The EGR cooler 23 and the exhaust gas heat recovery unit 24 are arranged in series in the device pathway 11c. The device pathway 11c is a heat generator pathway in which the EGR cooler 23 and the exhaust gas heat recovery unit 24 that are heat generators are provided.

The heater core pathway 11b and the device pathway 11c are connected to the engine pathway 11a in parallel with each other.

The EGR cooler 23 and the exhaust gas heat recovery unit 24 are arranged in the device pathway 11c in this order with respect to a flow direction of the coolant in the engine cooling circuit 11. That is, in the device pathway 11c, the EGR cooler 23 and the exhaust gas heat recovery unit 24 are arranged in this order from a coolant discharging side toward a coolant suction side of the engine pump 20.

The radiator 25 and a thermostat 27 are provided in the radiator pathway 11d. The radiator pathway 11d is provided in parallel with the heater core pathway 11b and the device pathway 11c. The thermostat 27 is a coolant temperature-sensitive valve in which a valve body is moved by means of a thermo-wax whose volume changes based on the temperature to open and close the coolant passage.

The bypass pathway 11e is provided in parallel with the heater core pathway 11b, the device pathway 11c, and the radiator pathway 11d. A cross-sectional area of a passage of the bypass pathway 11e is smaller than that of the other pathways 11a, 11b, 11c, 11d. That is, a passage resistance of the bypass pathway 11e is larger than that of the other pathways 11a, 11b, 11c, 11d of the engine cooling circuit 11.

The condenser circuit 12 includes a condenser pump (second pump) 30 and a condenser 31. The condenser pump 30 is an electric pump that suctions and discharges the coolant. The condenser pump 30 may be a belt driven pump.

The condenser 31 is a second heat source that heats the coolant. The condenser 31 is a high-pressure side heat exchanger that heats the coolant by exchanging heat between the coolant and the high-pressure side refrigerant in a refrigeration cycle 50.

The condenser circuit 12 includes a condenser pathway 12a. The condenser pathway 12a constitutes a coolant passage through which the coolant flows. The condenser pump 30 and the condenser 31 are arranged in series in the condenser pathway 12a. The condenser pathway 12a is a second heat source pathway in which the condenser 31 that is the second heat source is provided.

The refrigeration cycle 50 is a vapor-compression refrigerator that includes a compressor 51, the condenser 31, an expansion valve 52, and an evaporator 53. The refrigerant used in the refrigeration cycle 50 is a chlorofluorocarbon refrigerant. The refrigeration cycle 50 is a subcritical refrigeration cycle in which a high-pressure side refrigerant pressure does not exceed the critical pressure of the refrigerant.

The compressor 51 is an electric compressor that is driven by power supplied from a battery, and the compressor 51 draws, compresses, and discharges the refrigerant in the refrigeration cycle 50. The compressor 51 may be a variable displacement compressor that is driven by an engine belt while being supplied with a driving force from the engine.

The condenser 31 is a condensing device that condenses the high-pressure side refrigerant by exchanging heat between the coolant and the high-pressure refrigerant discharged from the compressor 51.

The expansion valve 52 is a decompressor that decompresses and expands a liquid refrigerant flowing out of the condenser 31. The expansion valve 52 includes a thermosensitive portion. The thermosensitive portion detects a superheat degree of the refrigerant on an outlet side of the evaporator 53 based on the temperature and the pressure of the refrigerant on the outlet side of the evaporator 53.

The expansion valve 52 is a thermal expansion valve that adjusts a throttle passage area by a mechanical mechanism such that the superheat degree of the refrigerant on the outlet side of the evaporator 53 is within a predetermined range. The expansion valve 52 may be an electric expansion valve that adjusts the throttle passage area by an electric mechanism.

The evaporator 53 is a low-pressure side heat exchanger that evaporates a low-pressure refrigerant decompressed and expanded by the expansion valve 52 by exchanging heat between the low-pressure refrigerant and the air blown to the vehicle compartment. The gas-phase refrigerant evaporated at the evaporator 53 is drawn into and compressed by the compressor 51.

The evaporator 53 may be a heat medium cooler that cools the coolant by exchanging heat between the refrigerant and the coolant. In this case, a heat medium-air heat exchanger, which exchanges heat between the air and the coolant cooled by the heat medium cooler, is provided in addition, and the heat medium-air heat exchanger cools the air sent to the vehicle compartment.

The engine cooling circuit 11 and the condenser circuit 12 are connected to a switching valve 40. The switching valve 40 is a switching portion that changes a condition of a flowing communication between the engine cooling circuit 11 and the condenser circuit 12.

The switching valve 40 is a four-way valve that includes four ports. A first port 40a of the switching valve 40 is connected to a part of the heater core pathway 11b which is located on the coolant outlet side of the heater core 22. A second port 40b of the switching valve 40 is connected to a junction portion 41 of the engine pathway 11a at which the device pathway 11c and the inlet side of the engine pump 20 are joined to each other.

A third port 40c of the switching valve 40 is connected to a part of the condenser pathway 12a which is located on the coolant discharge side of the condenser pump 30. A fourth port 40d of the switching valve 40 is connected to a part of the condenser pathway 12a which is located on the coolant intake side of the condenser pump 30.

FIG. 1 shows a condition where the switching valve 40 interrupts a flowing communication between the engine cooling circuit 11 and the condenser circuit 12. Specifically, the switching valve 40 connects the first port 40a and the second port 40b, and the switching valve 40 connects the third port 40c and the fourth port 40d. In this situation, the closing valve 26 opens the coolant passage of the engine pathway 11a.

According to this, in the engine cooling circuit 11, the coolant flowing out of the engine 21 flows, in parallel, through the heater core 22, the EGR cooler 23, and the exhaust gas heat recovery unit 24, and then the coolant flows into the engine 21.

That is, the coolant flowing out of the engine pathway 11a flows through the heater core pathway 11b and the device pathway 11c in parallel, and then the coolant flows into the engine pathway 11a.

Figure 2:
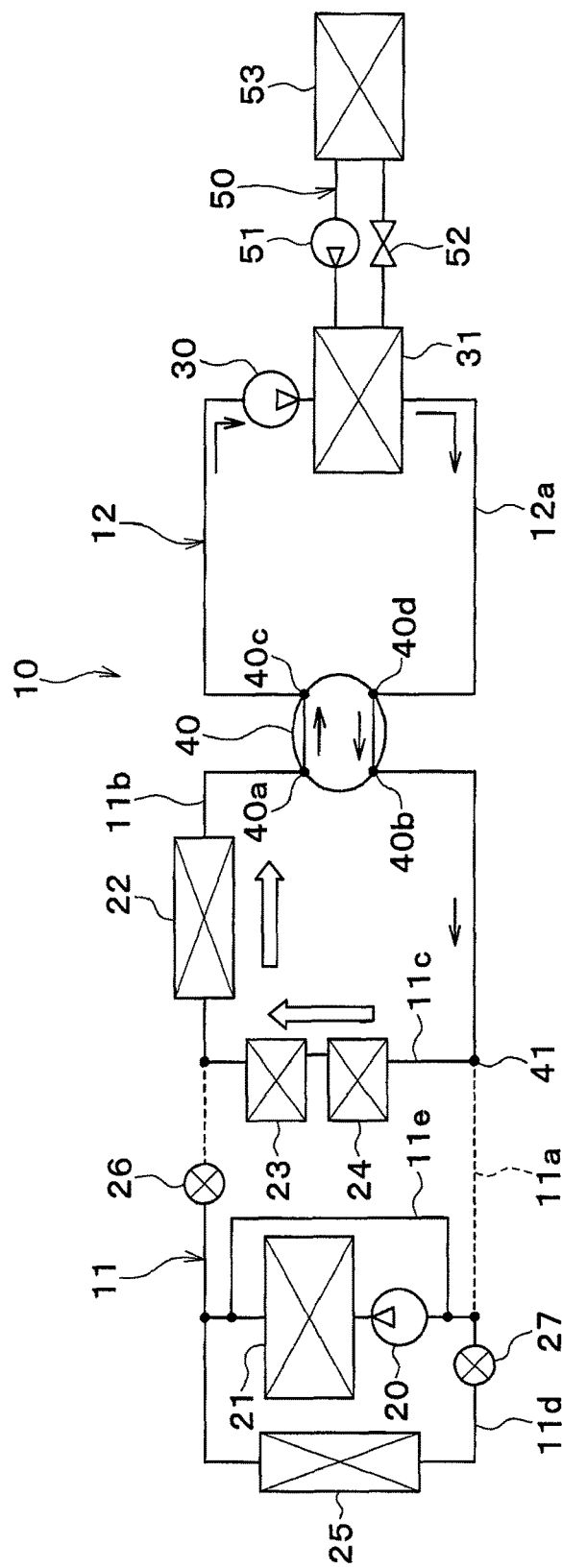
FIG. 2 is a diagram illustrating a situation where an engine cooling circuit and a condenser circuit communicate with each other in the vehicular heat management device, according to the embodiment.

FIG. 2 shows a condition where the switching valve 40 provides a flowing communication between the engine cooling circuit 11 and the condenser circuit 12. Specifically, the switching valve 40 connects the first port 40a and the third port 40c, and the switching valve 40 connects the second port 40b and the fourth port 40d. In this situation, the closing valve 26 closes the coolant passage of the engine pathway 11a.

According to this, in the condenser circuit 12, the coolant flowing out of the condenser 31 flows, in series and in order, through the exhaust gas heat recovery unit 24, the EGR cooler 23, and the heater core 22, and then the coolant flows into the condenser 31. That is, the coolant flowing out of the condenser pathway 12a flows, in series and in order, through the device pathway 11c and the heater core pathway 11b, and then the coolant flows into the condenser pathway 12a.

Figure 3:
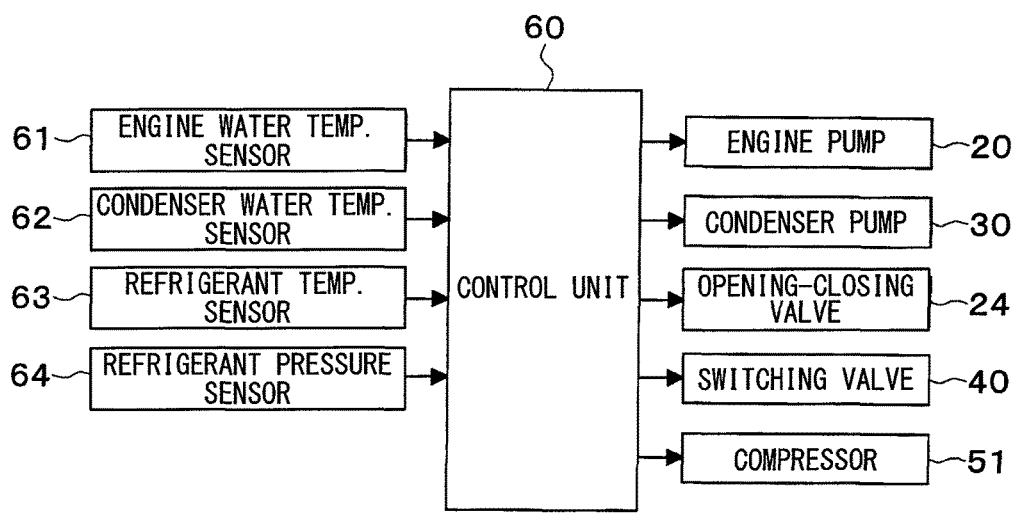
FIG. 3 is a block diagram illustrating an electric control unit of the vehicular heat management device, according to the embodiment.

Next, an electric control unit of the vehicular heat management device 10 will be described with reference to FIG. 3. A control unit 60 is constituted by a known microcomputer, including a CPU, a ROM, and a RAM, and a peripheral circuit thereof. The control unit 60 performs various computations and processing based on control programs stored in the ROM. Control target devices are connected to an output side of the control unit 60. The control unit 60 is a controlling portion that controls the operations of various control target devices.

The control target devices controlled by the control unit 60 include the engine pump 20, the condenser pump 30, the closing valve 26, the switching valve 40, and the compressor 51.

Detection signals from a group of sensors are input to the input side of the control unit 60. The group of sensors includes an engine water temperature sensor 61, a condenser water temperature sensor 62, a refrigerant temperature sensor 63, and a refrigerant pressure sensor 64.

The engine water temperature sensor 61 is a heat medium temperature detector that detects a temperature of the coolant in the engine cooling circuit 11. The condenser water temperature sensor 62 is a heat medium temperature detector that detects a temperature of the coolant in the condenser circuit 12.

The refrigerant temperature sensor 63 is a refrigerant temperature detector that detects a temperature of the refrigerant in the refrigeration cycle 50. For example, the refrigerant temperature sensor 63 detects a temperature of the refrigerant discharged from the compressor 51, or a temperature of the refrigerant that is to be drawn to the compressor 51.

The refrigerant pressure sensor 64 is a refrigerant pressure detector that detects a pressure of the refrigerant in the refrigeration cycle 50. For example, the refrigerant pressure sensor 64 detects a pressure of the refrigerant discharged from the compressor 51, or a pressure of the refrigerant that is to be drawn to the compressor 51.

Next, the operation of the above-mentioned configurations will be described. When the coolant cannot be sufficiently heated by the engine 21 or when it is expected that the coolant cannot be sufficiently heated by the engine 21 while the device pathway 11c is in flowing communication with the engine pathway 11a as shown in FIG. 1, the control unit 60 controls the operation of the switching valve 40 and the closing valve 26 such that the device pathway 11c is in flowing communication with the condenser pathway 12a as shown in FIG. 2.

According to this, when the coolant cannot be sufficiently heated by the engine 21, the coolant heated by the condenser 31 can be supplied to the heater core 22, the EGR cooler 23, and the exhaust gas heat recovery unit 24.

The condition where the coolant cannot be sufficiently heated by the engine 21 or where it is expected that the coolant cannot be sufficiently heated by the engine 21 is at least one of conditions where a temperature of the coolant in the engine pathway 11a is lower than a predetermined temperature, where it is determined that a decrease rate of the temperature of the coolant in the engine pathway 11a is larger than a predetermined value, or where it is determined that an availability of the condenser 31 is lower than a predetermined rate.

When the coolant can be sufficiently heated by the engine 21 or when it is expected that the coolant can be sufficiently heated by the engine 21 while the device pathway 11c is in flowing communication with the condenser pathway 12a, the control unit 60 controls the operation of the switching valve 40 and the closing valve 26 such that the device pathway 11c is in flowing communication with the engine pathway 11a as shown in FIG. 1. The control unit 60 may control the switching valve 40 and the closing valve 26 such that the coolant flows from the device pathway 11c to the engine pathway 11a.

According to this, when the coolant can be sufficiently heated by the engine 21, the coolant heated by the engine 21 can be supplied to the heater core 22, the EGR cooler 23, and the exhaust gas heat recovery unit 24.

The condition where the coolant can be sufficiently heated by the engine 21 or where it is expected that the coolant can be sufficiently heated by the engine 21 is at least one of conditions where the temperature of the coolant in the engine pathway 11a is higher than the temperature of the coolant in the condenser pathway 12a by a predetermined quantity or more, where the temperature of the coolant in the engine pathway 11a is higher than the predetermined temperature, and where it is determined that an increase rate of the temperature of the coolant in the engine pathway 11a is larger than an increase rate of the temperature of the coolant in the condenser pathway 12a.

In the present embodiment, the closing valve 26 and the switching valve 40 switch between a condition where the device pathway 11c is in flowing communication with the engine pathway 11a and a condition where the device pathway 11c is in flowing communication with the condenser pathway 12a. The closing valve 26 and the switching valve 40 may switch between a condition where a fluid flows from the device pathway 11c to the engine pathway 11a and a condition where a fluid flows from the device pathway 11c to the condenser pathway 12a.

According to this, the coolant heated by the condenser 31 can be introduced into the EGR cooler 23 in addition to the coolant heated by the engine 21. Further, since both the EGR cooler 23 and the exhaust gas heat recovery unit 24 are provided in the device pathway 11c, the coolant that is to flow into the EGR cooler 23 can be heated by a heat generated by the exhaust gas heat recovery unit 24. Accordingly, the coolant that is at or above the predetermined temperature can flow into the EGR cooler 23 early.

In the present embodiment, when the closing valve 26 and the switching valve 40 provide the flowing communication between the device pathway 11c and the engine pathway 11a, the coolant flows through the engine 21, the EGR cooler 23, and the exhaust gas heat recovery unit 24, in this order. When the closing valve 26 and the switching valve 40 provide the flowing communication between the device pathway 11c and the condenser pathway 12a, the coolant flows through the condenser 31, the exhaust gas heat recovery unit 24, and the EGR cooler 23, in this order.

According to this, since the coolant heated by the EGR cooler 23 flows into the exhaust gas heat recovery unit 24 when the device pathway 11c is in flowing communication with the engine pathway 11a, a heat exchanging amount in the exhaust gas heat recovery unit 24 can be reduced, and accordingly the temperature of the coolant can be decreased. Consequently, since a proportion of a cooling loss decreases and a proportion of a exhausting loss increases, an EGR rate can be increased.

The EGR rate means a value that is calculated by dividing the amount of the exhaust gas that is recirculated to the intake air of the engine 21 by the amount of the intake air of the engine 21.

In the present embodiment, the EGR cooler 23 and the exhaust gas heat recovery unit 24 are arranged in series in the device pathway 11c. When the closing valve 26 and the switching valve 40 provide the flowing communication between the device pathway 11c and the engine pathway 11a, the coolant flows through, in order, the EGR cooler 23 and the exhaust gas heat recovery unit 24 in the device pathway 11c. When the closing valve 26 and the switching valve 40 provide flowing communication between the device pathway 11c and the condenser pathway 12a, the coolant flows through, in order, the exhaust gas heat recovery unit 24 and the EGR cooler 23 in the device pathway 11c.

According to this, since the EGR cooler 23 and the exhaust gas heat recovery unit 24 are arranged in series, the configuration can be simplified. Since the proportion of heat exchange between the EGR cooler 23 and the coolant can be reduced when the device pathway 11c is in flowing communication with the condenser pathway 12a, the temperature of the EGR cooler 23 can be rapidly increased by heat generation of the EGR cooler 23. That is, the EGR cooler 23 can be heated early.

In the present embodiment, the closing valve 26 and the switching valve 40 switch between the condition where the heater core pathway 11b is in flowing communication with the device pathway 11c and the engine pathway 11a, and the condition where the heater core pathway 11b is in flowing communication with the device pathway 11c and the condenser pathway 12a.

According to this, waste heat of the EGR cooler 23 and the exhaust gas heat recovery unit 24 can be used for heating of the vehicle compartment.

In the present embodiment, when the closing valve 26 and the switching valve 40 provide the flowing communication between the heater core pathway 11b, the device pathway 11c and the engine pathway 11a, the device pathway 11c and the heater core pathway 11b are connected in parallel with each other. When the closing valve 26 and the switching valve 40 provide the flowing communication between the heater core pathway 11b, the device pathway 11c and the condenser pathway 12a, the device pathway 11c and the heater core pathway 11b are connected in series with each other.

According to this, when the heater core pathway 11b is in flowing communication with the device pathway 11c and the engine pathway 11a, the heat management can be effectively performed. That is, although the coolant heated by the engine 21 is at about 80 degrees Celsius, the coolant heated by the EGR cooler 23 and the exhaust gas heat recovery unit 24 is not needed because the required temperature of the heater core 22 is 60 degrees Celsius at most. Since the temperature of the coolant is sufficiently high, the heat exchange efficiency is also high. Accordingly, increasing of the flow rate of the coolant is not needed. Therefore, the arrangement of the heater core 22 parallel to the EGR cooler 23 and the exhaust gas heat recovery unit 24 improves efficiency.

When the heater core pathway 11b is in flowing communication with the device pathway 11c and the condenser pathway 12a, the coolant heated by the exhaust gas heat recovery unit 24 is capable of flowing into the EGR cooler 23. Accordingly, the coolant that is at or above the predetermined temperature is capable of flowing into the EGR cooler 23 early. After the coolant flowing into the EGR cooler 23 becomes at or above the predetermined temperature, the coolant heated by the exhaust gas heat recovery unit 24 can be used for heating of the vehicle compartment. Further, since the temperature of the coolant flowing into the condenser 31 can be decreased, the efficiency of the refrigeration cycle 50 in heating can be improved. That is, high COP heating can be achieved.

In the present embodiment, when the closing valve 26 and the switching valve 40 provide the flowing communication between the heater core pathway 11b, the device pathway 11c and the engine pathway 11a, the heater core pathway 11b is connected to a part of the engine pathway 11a which is located on the suction side of the first pump 20. When the closing valve 26 and the switching valve 40 provide the flowing communication between the heater core pathway 11b, the device pathway 11c and the condenser pathway 12a, the heater core pathway 11b is connected to a part of the condenser pathway 12a which is located on the suction side of the second pump 30.

According to this, the coolant in the heater core 22 flows in the same direction in the condition where the heater core pathway 11b is in flowing communication with the device pathway 11c and the engine pathway 11a and the condition where the heater core pathway 11b is in flowing communication with the device pathway 11c and the condenser pathway 12a. Accordingly, since the temperature distribution of the air heated by the heater core 22 can be constant, a decrease of comfort due to the fluctuation of the temperature distribution in the vehicle compartment during heating can be limited.

In the present embodiment, the switching valve 40 switches between the condition where the heater core pathway 11b is in flowing communication with the engine pathway 11a and the condition where the heater core pathway 11b is in flowing communication with the condenser pathway 12a.

According to this, waste heat of the EGR cooler 23 and the exhaust gas heat recovery unit 24 can be used for heating air with simple configuration.

Specifically, the switching valve 40 switches between the condition where the heater core pathway 11b is in flowing communication with the engine pathway 11a and the condition where the heater core pathway 11b is in flowing communication with the condenser pathway 12a while the engine pathway 11a is in flowing communication with the condenser pathway 12a. The closing valve 26 switches between the condition where the coolant flows through the engine pathway 11a and the condition where the flow of the coolant in the engine pathway 11a is stopped.

According to this, the condition where the coolant heated by the engine 21 flows through the heater core 22, the EGR cooler 23, and the exhaust gas heat recovery unit 24 and the condition where the coolant heated by the condenser 31 flows through the heater core 22, the EGR cooler 23, and the exhaust gas heat recovery unit 24 can be switched by a simple configuration.

In the present embodiment, the control unit 60 controls the operation of the closing valve 26 and the switching valve 40 based on the temperature of the coolant in the engine pathway 11a.

Specifically, when the temperature of the coolant in the engine pathway 11a is higher than the temperature of the coolant in the condenser pathway 12a by the predetermined value or more, when the temperature of the coolant in the engine pathway 11a is higher than a predetermined temperature, or when it is determined that an increase rate of the temperature of the coolant in the engine pathway 11a is larger than an increase rate of the temperature of the coolant in the condenser pathway 12a while the device pathway 11c is in flowing communication with the condenser pathway 12a, the control unit 60 controls the operation of the closing valve 26 and the switching valve 40 such that the device pathway 11c is in flowing communication with the engine pathway 11a.

According to this, when the coolant can be sufficiently heated by the engine 21 or when it is expected that the coolant can be sufficiently heated by the engine 21, the coolant heated by the engine 21 can be introduced into the EGR cooler 23 and the exhaust gas heat recovery unit 24.

Specifically, when the temperature of the coolant in the engine pathway 11a is lower than the predetermined temperature, when it is determined that a decrease rate of the temperature of the coolant in the engine pathway 11a is higher than a predetermined value, or when it is determined that availability of the engine 21 is lower than a predetermined rate while the device pathway 11c is in flowing communication with the engine pathway 11a, the control unit 60 controls the operation of the closing valve 26 and the switching valve 40 such that the device pathway 11c is in flowing communication with the condenser pathway 12a.

According to this, when the coolant cannot be sufficiently heated by the engine 21, or when it is expected that the coolant cannot be sufficiently heated by the engine 21, the coolant heated by the condenser 31 can be introduced into the EGR cooler 23 and the exhaust gas heat recovery unit 24.

The above-described embodiment can be modified as below.

In the above-described embodiment, the switching valve 40 is a four-way valve, but multiple two-way valves or three-way valves may be used instead.

In the above-described embodiment, the EGR cooler 23 and the exhaust gas heat recovery unit 24 are arranged in series in the device pathway 11c, but the EGR cooler 23 and the exhaust gas heat recovery unit 24 may be arranged in parallel with each other in the device pathway 11c.

In the above-described embodiment, the coolant is used as the heat medium flowing through the engine cooling circuit 11, the condenser circuit 12, and the chiller circuit 13, but another medium such as oil may be used as the heat medium.

A nanofluid may be used as the heat medium. The nanofluid is a fluid containing nanometer-sized particles, called nanoparticles. Since the nanoparticles are contained, the following effects can be obtained in addition to the effect of decreasing the freezing point like a coolant containing ethylene glycol (i.e. antifreeze mixture).

That is, an effect of improving thermal conductivity within a specific temperature range, an effect of increasing a heat capacity of the heat medium, an effect of limiting corrosion of metal pipes and deterioration of rubber pipes, and an effect of increasing fluidity of the heat medium at an extremely low temperature can be obtained.

These effects vary based on components of nanoparticles, shapes of the particles, a proportion of the particles, and additives.

Thus, since the mixture of nanoparticles can improve its thermal conductivity, even in a small amount, the mixture of nanoparticles can exhibit substantially the same cooling efficiency, compared with the coolant using ethylene glycol.

Further, since the thermal capacity of the heat medium can be increased, a cold storage heat amount of the heat medium itself can be increased. The cold storage heat amount of the heat medium itself means the amount of stored cold heat due to its sensible heat.

By increasing the cold storage heat amount, the temperature adjustment, including cooling and heating, of the device can be performed using the cold heat storage for some period of time even though the compressor 26 is not operated, thereby saving the power of the vehicular heat management system 10.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Specifically, examples of the atom configuring the nanoparticles can include an Au nanoparticle, an Ag nanowire, a CNT, a graphene, a graphite core-shell nanoparticle, an Au nanoparticle-containing CNT, and the like. The CNT is a carbon nanotube. The graphite core-shell nanoparticle is a particle body with the above-mentioned atom surrounded by a structure, such as a carbon nanotube.

In the refrigeration cycle 50 of the above-mentioned embodiment, a chlorofluorocarbon refrigerant is used as the refrigerant. However, the kind of refrigerant in use is not limited thereto and may be natural refrigerant, such as carbon dioxide, a hydrocarbon refrigerant, and the like.

The refrigeration cycle 50 in the above-mentioned embodiment constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

In the above-described embodiment, the second heat source that heats the coolant is the condenser 31, but the second heat source that heats the coolant may be an electric heater that generates heat by electricity, or a cooler that cools devices mounted in a vehicle during operation.

The flowing communication may mean a connection through which a fluid may flow.

Although the present disclosure has been fully described in connection with the preferred embodiments thereof, it is to be noted that various changes and modifications will become apparent to those skilled in the art. Moreover, other combinations and configurations, including more, less or only a single element, are also within the spirit and scope of the present disclosure.

What is claimed is:

1. A vehicular heat management device, comprising:
    a first heat source and a second heat source which heat a heat medium;
    a first heat generator that generates heat according to operation of the first heat generator, the heat medium flowing into the first heat generator being required to be at or above a predetermined temperature;
    a second heat generator that generates heat according to operation of the second heat generator;
    a heat generator pathway in which the first heat generator and the second heat generator are provided;
    a first heat source pathway in which the first heat source is provided;
    a second heat source pathway in which the second heat source is provided; and
    a switching portion configured to switch a fluid circuit connecting the heat generator pathway, the first heat source pathway and the second heat source pathway between
        a first state in which the heat generator pathway is in flowing communication with the first heat source pathway while stopping flowing communication between the heat generator pathway and the second heat source pathway, and
        a second state in which the heat generator pathway is in flowing communication with the second heat source pathway while stopping flowing communication between the heat generator pathway and the first heat source pathway.

2. The vehicular heat management device according to claim 1, wherein
    the switching portion provides a flowing communication between the heat generator pathway and the first heat source pathway, the heat medium flows, in order, through the first heat source, the first heat generator, and the second heat generator, and
    the switching portion provides a flowing communication between the heat generator pathway and the second heat source pathway, the heat medium flows, in order, through the second heat source, the second heat generator, and the first heat generator.

3. The vehicular heat management device according to claim 2, wherein
    the first heat generator and the second heat generator are arranged in series in the heat generator pathway,
    the switching portion provides the flowing communication between the heat generator pathway and the first heat source pathway, the heat medium flows, in order, through the first heat generator and the second heat generator in the heat generator pathway, and the switching portion provides the flowing communication between the heat generator pathway and the second heat source pathway, the heat medium flows, in order, through the second heat generator, and the first heat generator in the heat generator pathway.

4. The vehicular heat management device according to claim 1, further comprising:

a heater core that heats an air by exchanging heat between the air and the heat medium, the air being sent to a vehicle compartment; and a heater core pathway in which the heater core is provided, wherein the switching portion switches between a condition where the heater core pathway is in flowing communication with the heat generator pathway and the first heat source pathway, and a condition where the heater core pathway is in flowing communication with the heat generator pathway and the second heat source pathway.

5. The vehicular heat management device according to claim 4, wherein the switching portion provides a flowing communication between the heater core pathway, the heat generator pathway and the first heat source pathway, the heat generator pathway is connected in parallel with the heater core pathway, and the switching portion provides a flowing communication between the heater core pathway, the heat generator pathway and the second heat source pathway, the heat generator pathway is connected in series with the heater core pathway.

6. The vehicular heat management device according to claim 5, further comprising:

a first pump that suctions the heat medium of the first heat source pathway; and a second pump that suctions the heat medium of the second heat source pathway, wherein the switching portion provides the flowing communication between the heater core pathway, the heat generator pathway and the first heat source pathway, the heater core pathway is connected to a part of the first heat source pathway which is located on a suction side of the first pump, and the switching portion provides the flowing communication between the heater core pathway, the heat generator pathway and the second heat source pathway, the heater core pathway is connected to a part of the second heat source pathway which is located on a suction side of the second pump.

7. The vehicular heat management device according to claim 6, wherein the switching portion includes a switching valve that switches between a condition where the heater core pathway is in flowing communication with the first heat source pathway, and a condition where the heater core pathway is in flowing communication with the second heat source pathway.

8. The vehicular heat management device according to claim 7, wherein the switching valve switches between the condition where the heater core pathway is in flowing communication with the first heat source pathway, and a condition where the heater core pathway is in flowing communication with the second heat source pathway, and the first heat source pathway is in flowing communication with the second heat source pathway.

9. The vehicular heat management device according to claim 8, wherein the switching portion includes a closing portion that switches between a condition where the heat medium flows through the first heat source pathway, and a condition where a flow of the heat medium in the first heat source pathway is stopped.

10. The vehicular heat management device according to claim 1, further comprising:

a control unit that controls an operation of the switching portion based on a temperature of the heat medium in the first heat source pathway.

11. The vehicular heat management device according to claim 10, wherein at least one of a plurality of first conditions is met while the heat generator pathway is connected to the second heat source pathway, the control unit controls the operation of the switching portion such that the heat generator pathway communicates with the first heat source pathway, and the plurality of first conditions include a condition where the temperature of the heat medium in the first heat source pathway is higher than a temperature of the heat medium in the second heat source pathway by a predetermined value or more, a condition where the temperature of the heat medium in the first heat source pathway is higher than a predetermined temperature, and a condition where it is determined that an increase rate of the temperature of the heat medium in the first heat source pathway is larger than an increase rate of the temperature of the heat medium in the second heat source pathway.

12. The vehicular heat management device according to claim 10, wherein at least one of a plurality of second conditions is met while the heat generator pathway is connected to the first heat source pathway, the control unit controls the switching portion such that the heat generator pathway communicates with the second heat source pathway, and the plurality of second conditions include a condition where the temperature of the heat medium in the first heat source pathway is lower than a predetermined temperature, a condition where it is determined that a decrease rate of the temperature of the heat medium in the first heat source pathway is larger than a predetermined temperature, and a condition where it is determined that an availability of the first heat source is lower than a predetermined rate.

13. A vehicular heat management device, comprising:

a first heat source and a second heat source which heat a heat medium;

a first heat generator that generates heat according to operation of the first heat generator, the heat medium flowing into the first heat generator being required to be at or above a predetermined temperature;

a second heat generator that generates heat according to operation of the second heat generator;

a heat generator pathway in which the first heat generator and the second heat generator are provided;
a first heat source pathway in which the first heat source is provided;
a second heat source pathway in which the second heat source is provided; and
a switching portion configured to switch between
a first state in which the heat generator pathway is in flowing communication with the first heat source pathway, and
a second state in which the heat generator pathway is in flowing communication with the second heat source pathway, wherein
the switching portion provides a flowing communication between the heat generator pathway and the first heat source pathway, the heat medium flows, in order, through the first heat source, the first heat generator, and the second heat generator, and
the switching portion provides a flowing communication between the heat generator pathway and the second heat source pathway, the heat medium flows, in order, through the second heat source, the second heat generator, and the first heat generator.

* * * * *